(12) United States Patent
Sakai (10) Patent No.: US 8,011,838 B2
(45) Date of Patent: Sep. 6, 2011

(54) FOCAL-PLANE SHUTTER AND IMAGE PICKUP APPARATUS

(75) Inventor: Masanori Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 12/557,429

(22) Filed: Sep. 10, 2009

(65) Prior Publication Data

US 2010/0067897 A1 Mar. 18, 2010

(30) Foreign Application Priority Data

Sep. 16, 2008 (JP) ................................. 2008-236625

(51) Int. Cl.
*G03B 9/40* (2006.01)
(52) U.S. Cl. ........................................ 396/488; 396/489
(58) Field of Classification Search .................. 396/484, 396/487–489
See application file for complete search history.

(56) References Cited

U.S. PATENT DOCUMENTS

| 4,975,722 A | 12/1990 | Suzuki et al. |
| 5,659,821 A | 8/1997 | Kawakita et al. |
| 7,708,477 B2 * | 5/2010 | Arai et al. ..................... 396/357 |
| 2002/0197078 A1 | 12/2002 | Toyoda |
| 2004/0047626 A1 * | 3/2004 | Miyazaki ..................... 396/489 |
| 2007/0237518 A1 | 10/2007 | Ichihara et al. |
| 2007/0253707 A1 | 11/2007 | Yoshida et al. |

FOREIGN PATENT DOCUMENTS

| JP | 2000-002907 | 1/2000 |
| JP | 2006-221054 | 8/2006 |

OTHER PUBLICATIONS

All of the above references were cited in a Jan. 20, 2010 European Search Report of the counterpart European Patent Application 09170130.0.

* cited by examiner

*Primary Examiner* — W. B. Perkey
(74) *Attorney, Agent, or Firm* — Cowan, Liebowitz & Latman, P.C.

(57) ABSTRACT

A focal-plane shutter 105 includes a leading blade driving member 4 rotatably fitted onto a first shaft 1*d* and driven by a biasing force of a leading blade driving spring 8, a trailing blade driving member 5 rotatably fitted onto a second shaft 1*e* and driven by a biasing force of a trailing blade driving spring 9, a leading blade adjusting member 6 rotatably fitted onto the first shaft 1*d* and adjusting the biasing force of the leading blade driving spring 8, a trailing blade adjusting member 7 rotatably fitted onto the second shaft 1*e* and adjusting the biasing force of the trailing blade driving spring 9, and an upper base plate 3 including a first surface 3*a* and a second surface 3*b* that are thrust position limiters. An area of the first surface 3*a* is larger than that of the second surface 3*b*.

10 Claims, 8 Drawing Sheets

FOCAL-PLANE SHUTTER AND IMAGE PICKUP APPARATUS

BACKGROUND OF THE INVENTION

1. Field of the Invention

The present invention relates to a focal-plane shutter used for a camera, which sequentially operates a leading blade group and a trailing blade group to be able to perform exposure by slit forming blades of the two blade groups.

2. Description of the Related Art

A focal-plane shutter which is configured to sequentially operate a leading blade group and a trailing blade group to perform exposure by slit forming blades of the two blade groups is widely adopted for a single-lens reflex image pickup system or the like (see Japanese Patent Laid-open No. 2006-221054). In such a focal-plane shutter, a leading blade driving member and a trailing blade driving member which are biased by a leading blade driving spring and a trailing blade driving spring respectively are configured to start rotating at a predetermined timing to perform exposure using the leading blade group and the trailing blade group (a first conventional configuration).

Here, a behavior when a change of the blade velocity occurs due to some kind of factors will be considered. Commonly, a leading blade velocity is not necessarily equal to a trailing blade velocity, but for the sake of shorthand, it is assumed that the leading blade velocity is equal to the trailing blade velocity in an initial state.

Even if the leading blade velocity and the trailing blade velocity change, an amount of exposure does not change if the relative velocity between the leading blade velocity and the trailing blade velocity is constant. However, the amount of exposure changes so as to be increased when the leading blade velocity is faster than the trailing blade velocity. On the other hand, the amount of exposure changes so as to be decreased when the leading blade velocity is slower than the trailing blade velocity.

When the leading blade velocity is slower than the trailing blade velocity, a slit that is to be formed by the leading blade group and the trailing blade group is not formed, which causes a phenomenon called a blade shut in which exposure for an imaging area is not performed. This phenomenon is fatal for a focal-plane shutter.

A focal-plane shutter disclosed in Japanese Patent Laid-open No. 2000-2907, in order to prevent the blade shut, a sliding contact area of the trailing blade driving member is configured to be larger than that of the leading blade driving member. In such a configuration, even if the blade velocity changes in a low-temperature environment, the generation of the blade shut is suppressed (a second conventional configuration).

However, in the first conventional configuration described above, the generation of the blade shut caused by a change of the blade velocity under a high-temperature or low-temperature environment or a change with the passage of time can not be suppressed. On the other hand, in the second conventional configuration, it is considered that the generation of the blade shut under a low-temperature environment is suppressed, but it is not considered that the generation of the blade shut in a case where the blade velocity changes in accordance with a change with the passage of time is suppressed.

BRIEF SUMMARY OF THE INVENTION

The present invention provides a focal-plane shutter capable of suppressing the generation of the blade shut caused by changes with the passage of time.

A focal-plane shutter as one aspect of the present invention comprises a leading blade driving member configured to be rotatably fitted onto a first shaft provided on a shutter base plate and to be driven by a biasing force of a leading blade driving spring, a trailing blade driving member configured to be rotatably fitted onto a second shaft provided on the shutter base plate and to be driven by a biasing force of a trailing blade driving spring, a leading blade adjusting member configured to be rotatably fitted onto the first shaft and to adjust the biasing force of the leading blade driving spring, a trailing blade adjusting member configured to be rotatably fitted onto the second shaft and to adjust the biasing force of the trailing blade driving spring, and a tilt adjusting member for adjusting a tilt of the trailing blade adjusting member caused by the trailing blade driving spring to be greater than that of the leading blade adjusting member caused by the leading blade driving spring.

An image pickup apparatus as another aspect of the present invention comprises an image pickup element configured to perform photoelectric conversion, and the focal-plane shutter.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 8:
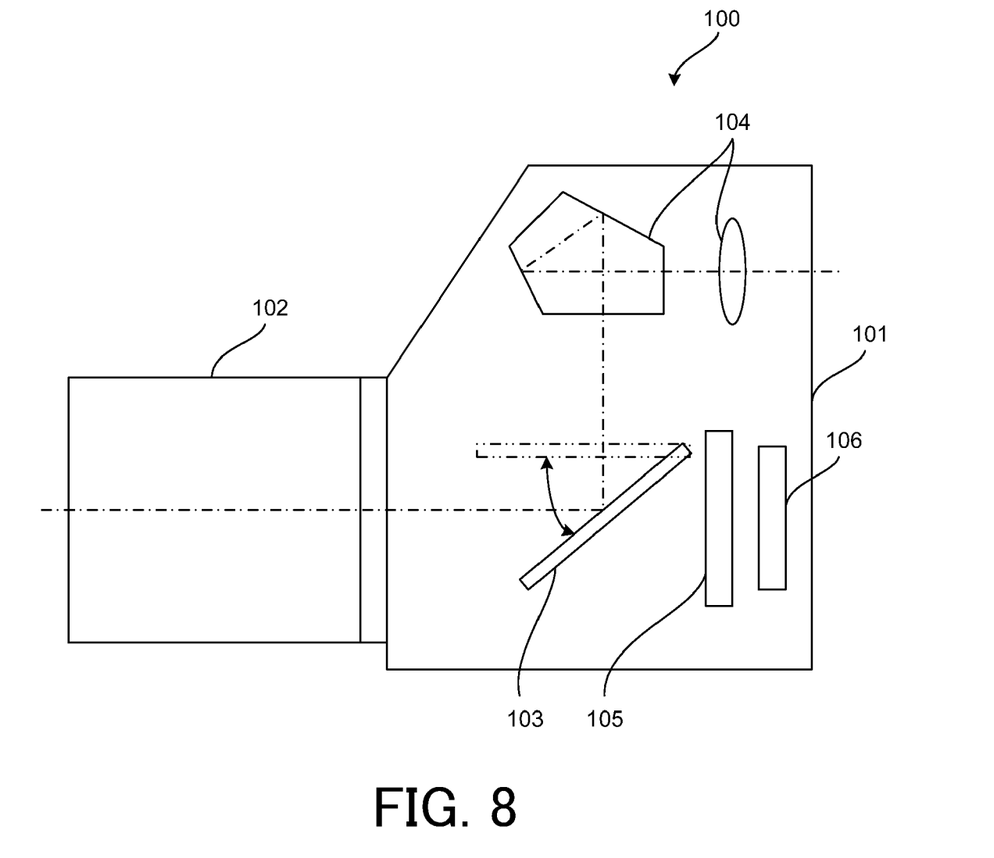
FIG. 8 is a schematic configuration view of a single-lens reflex image pickup system in an embodiment of the present invention.

First, a configuration of a single-lens reflex image pickup system in an embodiment of the present invention will be described. FIG. 8 is a schematic configuration view of a single-lens reflex image pickup system 100 in the embodiment of the present invention.

As shown in FIG. 8, the single-lens reflex image pickup system 100 includes a camera body 101 as an image pickup apparatus and an interchangeable lens 102 which is detachable from the camera body 101.

A finder optical system 104 is provided inside the camera body 101. A quick return mirror 103 as an optical member which is movable between a down position for guiding a light beam from the interchangeable lens 102 to the finder optical system 104 and an up position for evacuating a path of the light beam from the interchangeable lens 102 is also provided.

An image pickup element 106 such as a CCD sensor or a CMOS sensor which performs a photoelectric conversion of an object image formed by the interchangeable lens 102 is also provided inside the camera body 101. Reference numeral 105 denotes a focal-plane shutter which controls an exposure amount of the image pickup element 106. The focal-plane shutter 105 is provided with a leading blade group and a trailing blade group which open and shut its opening portion.

Embodiment 1

Next, referring to FIGS. 1 to 4, a focal-plane shutter in embodiment 1 of the present invention will be described.

Figure 1:
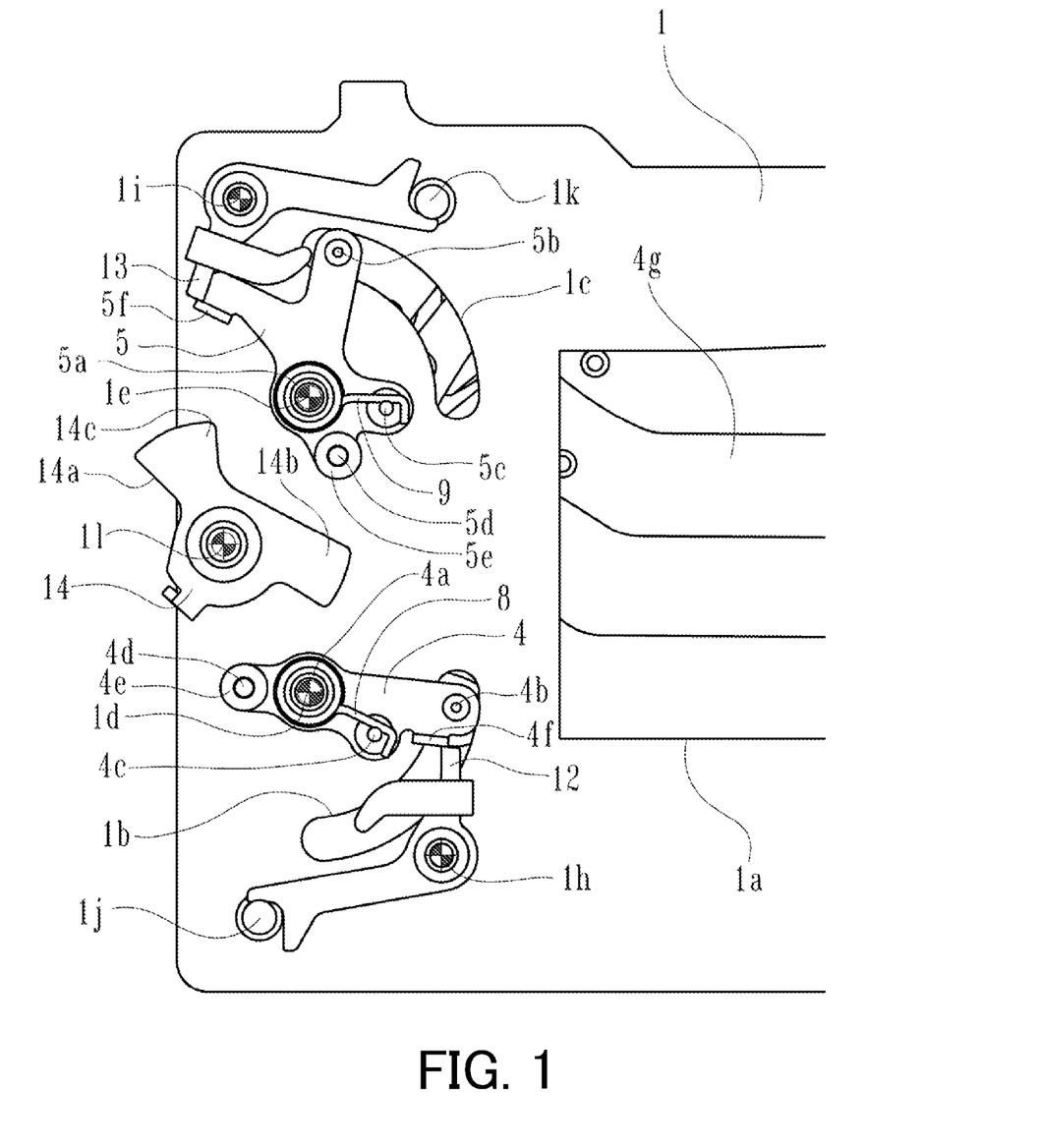
FIG. 1 is a plan view showing a blade pre-movement standby state of a focal-plane shutter in an embodiment of the present invention.
Figure 2:
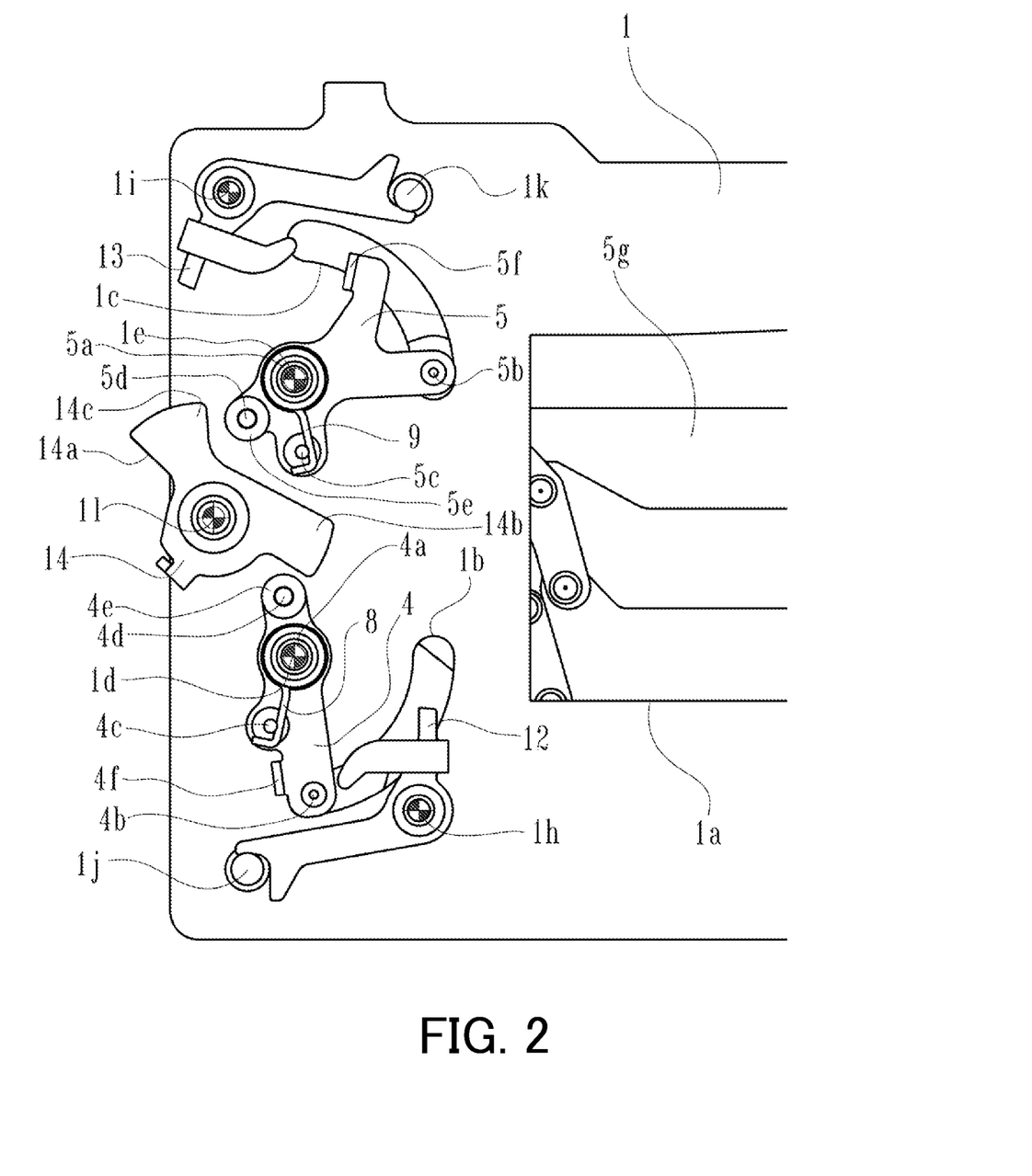
FIG. 2 is a plan view showing a blade movement completion state of a focal-plane shutter in an embodiment of the present invention.
Figure 3:
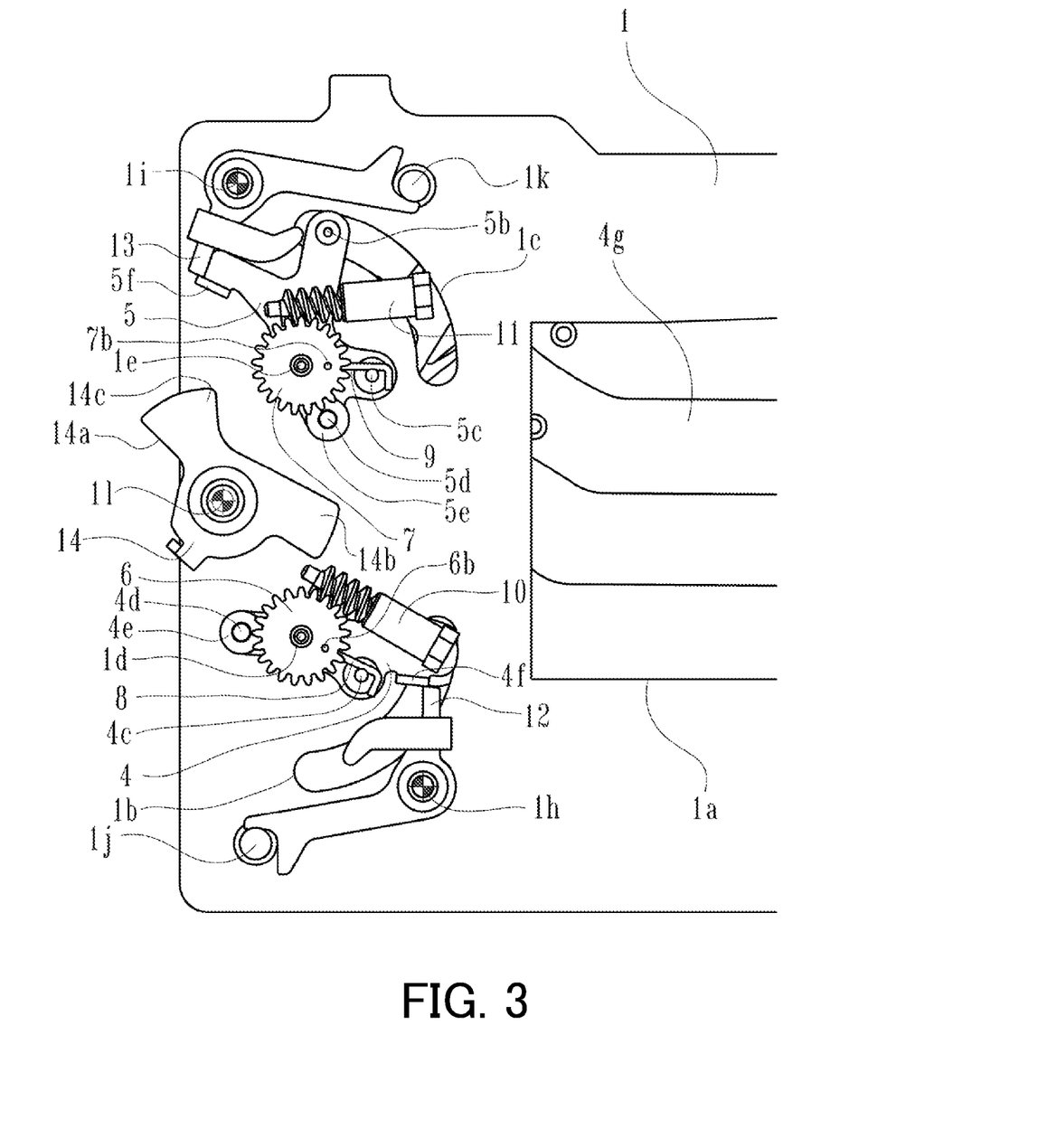
FIG. 3 is a plan view showing a drive spring adjusting mechanism of a focal-plane shutter in an embodiment of the present invention.
Figure 4:
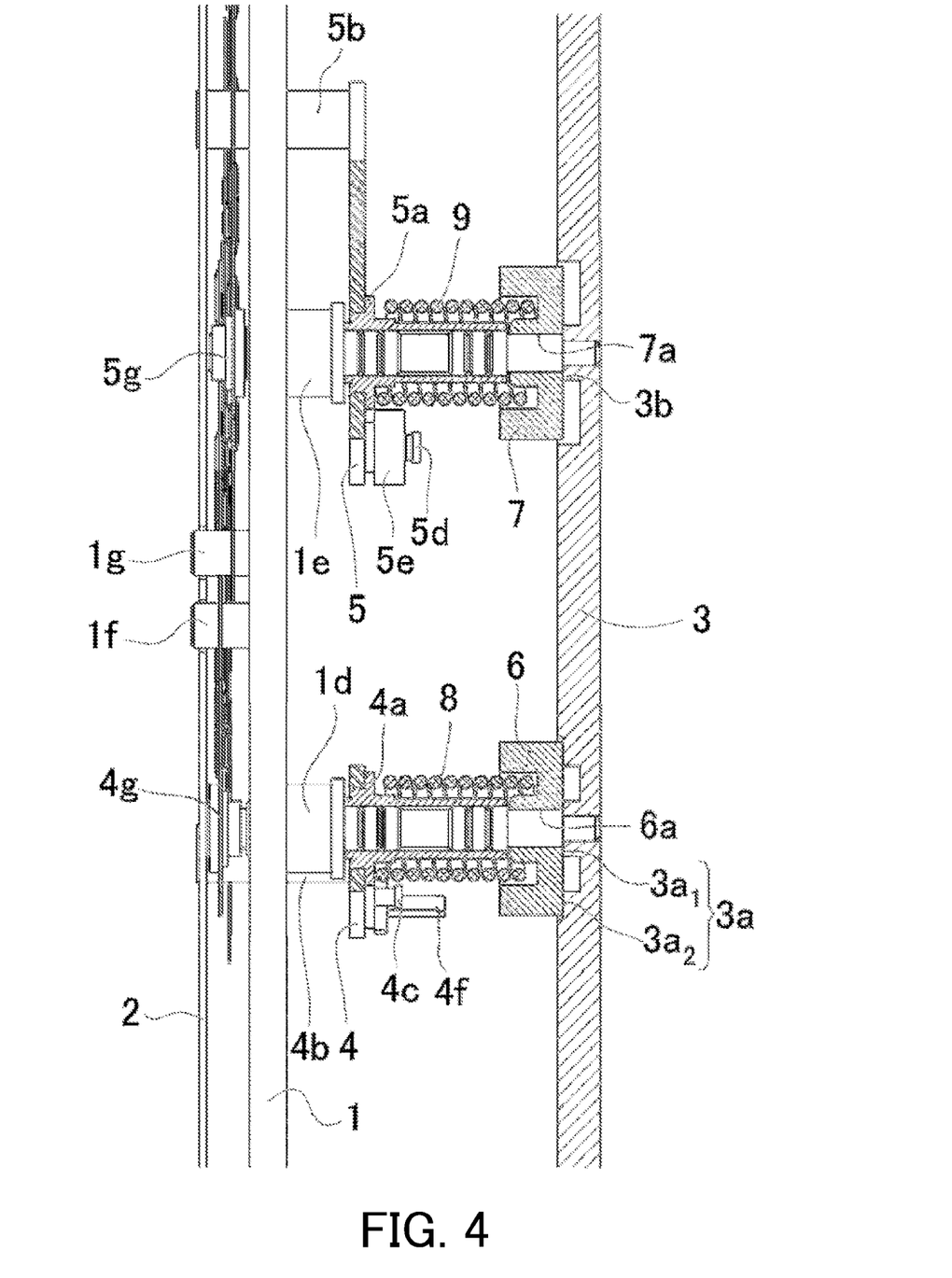
FIG. 4 is a main cross-sectional view of a focal-plane shutter in embodiment 1 of the present invention when viewed from a left side of FIG. 1.

FIG. 1 is a plan view showing a blade pre-movement standby state of the focal-plane shutter in the present embodiment, and FIG. 2 is a plan view showing a blade movement completion state of the focal-plane shutter in the present embodiment. FIG. 3 shows an adjusting mechanism of a driving spring of the focal-plane shutter in the present embodiment, and it shows the same state as that of FIG. 1. All of FIGS. 1 to 3 are plan views showing roughly the left half of the focal-plane shutter when viewed from an object side in a state where the focal-plane shutter is assembled in a camera. FIG. 4 is a main cross-sectional view of the focal-plane shutter of FIG. 1 when viewed from the left side, and members which are unnecessary for the description are omitted for seeing FIG. 4 easily.

Reference numeral 1 denotes a shutter base plate of the focal-plane shutter. Each of parts constituting driving mechanisms of the leading blade group and the trailing blade group is attached to the shutter base plate 1. Reference numeral 1*a* denotes an aperture through which light beam from the object passes. The aperture 1*a* is formed on the shutter base plate 1.

A partition plate (not shown) and a cover plate 2 shown in FIG. 4 are attached to a back side of the shutter base plate 1. An aperture which has a shape similar to that of the aperture 1*a* is also formed on each of the partition plate and the cover plate 2. A rectangular exposure aperture is formed by overlapping these three apertures.

A leading blade elongate hole 1*b* and a trailing blade elongate hole 1*c*, each of which has a circular arc shape, are formed in the shutter base plate 1. As shown in FIG. 4, a leading blade shaft 1*d* (first shaft) and a trailing blade shaft 1*e* (second shaft) are attached by a swaging process in a state of passing through the shutter base plate 1.

A leading blade rotating shaft 1*f* and a trailing blade rotating shaft 1*g* are attached to a back surface of the shutter base plate 1 by the swaging process. A leading blade securing lever shaft 1*h*, a trailing blade securing lever shaft 1*i*, a leading blade securing stopper shaft 1*j*, a trailing blade securing stopper shaft 1*k*, and a charge lever shaft 1*l* are attached to a surface of the shutter base plate 1 by the swaging process. Further, as shown in FIG. 4, an upper base plate 3 molded in synthetic resin is fitted onto the leading blade shaft 1*d* and the trailing blade shaft 1*e* to be attached to the shutter base plate 1.

A moving magnet type electromagnetic actuator is attached to the upper base plate 3 for operating a leading blade securing lever and a trailing blade securing lever described later. Since the configuration of such an electromagnetic actuator is well-known and is not specifically necessary to describe it in the present embodiment, it is not shown in the drawings.

A leading blade driving lever 4 (leading blade driving member) and a trailing blade driving lever 5 (trailing blade driving member) are rotatably attached to the leading blade shaft 1*d* and the trailing blade shaft 1*e*, respectively. Bearings 4*a* and 5*a* fitted onto the leading blade shaft 1*d* and the trailing blade shaft 1*e*, blade driving pins 4*b* and 5*b*, spring hook shafts 4*c* and 5*c*, and roller shafts 4*d* and 5*d* are swaged on the leading blade driving lever 4 and the trailing blade driving lever 5, respectively. Rollers 4*e* and 5*e* are rotatably attached to the roller shafts 4*d* and 5*d*, respectively. Further, portions to be latched 4*f* and 5*f* for being latched with securing levers described later are provided on the leading blade driving lever 4 and the trailing blade driving lever 5, respectively.

Rotation ranges of the leading blade driving lever 4 and the trailing blade driving lever 5 are limited by the leading blade elongate hole 1*b* and the trailing blade elongate hole 1*c*, respectively.

The blade driving pins 4*b* and 5*b* pass through the leading blade elongate hole 1*b* and the trailing blade elongate hole 1*c* to be connected to a leading blade group 4*g* and a trailing blade group 5*g*, respectively. Each of both blade groups of the leading blade group 4*g* and the trailing blade group 5*g* are, as is well known, constituted by two arms and a plurality of blades connected to them.

As shown in FIGS. 3 and 4, a leading blade adjusting gear 6 (a leading blade adjusting member) and a trailing blade adjusting gear 7 (a trailing blade adjusting member), each of which is molded from synthetic resin, are rotatably attached to the leading blade shaft 1*d* and the trailing blade shaft 1*e*, respectively. A leading blade driving spring 8 and a trailing blade driving spring 9 that are torsional coil springs are disposed at the outer circumferences of the bearings 4*a* and 5*a* of the leading blade driving lever 4 and the trailing blade driving lever 5, respectively.

One end of the leading blade driving spring 8 and one end of the trailing blade driving spring 9 are hooked into spring hook holes 6*b* and 7*b* of the leading blade adjusting gear 6 and the trailing blade adjusting gear 7, respectively. The other ends of the leading blade driving spring 8 and the trailing blade driving spring 9 are hooked with the spring hook shafts 4*c* and 5*c*, respectively.

A leading blade worm 10 and a trailing blade worm 11 are rotatably attached to the upper base plate 3, and they engage with the leading blade adjusting gear 6 and the trailing blade adjusting gear 7, respectively. Therefore, the leading blade adjusting gear 6 and the trailing blade adjusting gear 7 rotate in accordance with the rotation of the leading blade worm 10 and the trailing blade worm 11 to adjust biasing forces of the leading blade driving spring 8 and the trailing blade driving spring 9, respectively. These biasing forces rotate the leading blade driving lever 4 and the trailing blade driving lever 5 in a clockwise direction in FIG. 3, respectively.

The leading blade adjusting gear 6, the trailing blade adjusting gear 7, and the gears of the leading blade worm 10 and the trailing blade worm 11 can be designed to be desired configurations. For example, such a configuration that the leading blade adjusting gear 6 and the trailing blade adjusting gear 7 rotate in accordance with the rotation of the leading blade worm 10 and the trailing blade worm 11 can be adopted. On the other hand, a configuration where the leading blade adjusting gear 6 and the trailing blade adjusting gear 7 do not rotate even if biasing forces of the leading blade driving spring 8 and the trailing blade driving spring 9 are applied to the leading blade adjusting gear 6 and the trailing blade adjusting gear 7, respectively, can be adopted.

The leading blade driving spring 8 and the trailing blade driving spring 9 also act as compression coil springs, and bias the leading blade adjusting gear 6 and the trailing blade adjusting gear 7 toward the upper base plate 3 and the leading blade driving lever 4 and the trailing blade driving lever 5 toward the shutter base plate 1, respectively.

A leading blade securing lever 12 and a trailing blade securing lever 13 are rotatably attached to the leading blade securing lever shaft 1*h* and the trailing blade securing lever shaft 1*i*, respectively. A spring (not shown) is hooked with each securing lever, and each securing lever is biased in a counterclockwise direction. A rotation range of each securing lever is limited by a leading blade securing stopper shaft 1*j* and a trailing blade securing stopper shaft 1*k*.

In a state shown in FIG. 1, the leading blade securing lever 12 and the trailing blade securing lever 13 are hooked with the portions to be latched 4*f* and 5*f* of the leading blade driving lever 4 and the trailing blade driving lever 5 so as to be in a state where the rotation of each driving lever is inhibited.

In this state, first, the leading blade securing lever 12 rotates in a clockwise direction in accordance with the operation of a leading blade electromagnetic actuator (not shown). Thus, the latch between the leading blade securing lever 12 and the leading blade driving lever 4 is released, and the leading blade driving lever 4 rotates in a clockwise direction. In accordance with the rotation of the leading blade driving lever 4 in the clockwise direction, the leading blade group 4*g* moves from top to bottom.

Subsequently, the trailing blade securing lever 13 rotates in a clockwise direction in accordance with the operation of a trailing blade electromagnetic actuator (not shown), the latch between the trailing blade securing lever 13 and the trailing blade driving lever 5 is released, and the trailing blade driving lever 5 rotates in a clockwise direction. In accordance with the rotation of the trailing blade driving lever 5 in the clockwise direction, the trailing blade group 5*g* moves from top to bottom to be in a movement completion state shown in FIG. 2.

A charge lever 14 is rotatably supported on a charge lever shaft 11. The charge lever 14 is biased by a spring (not shown) in a counterclockwise direction. Further, a portion to be pressed 14*a* which is pressed by a charge lever driving member (not shown) is formed on the charge lever 14.

Next, a charge motion in the focal-plane shutter of the present embodiment will be described.

In the movement completion state shown in FIG. 2, the charge lever driving member operates in accordance with receiving a driving force from a driving source. When the charge lever driving member presses the portion to be pressed 14*a*, the charge lever 14 rotates in a clockwise direction.

In this case, first, a leading blade charge cam portion 14*b* of the charge lever 14 presses the roller 4*e* of the leading blade driving lever 4 to rotate the leading blade driving lever 4 in a counterclockwise direction against the biasing force of the leading blade driving spring 8. Subsequently, the trailing blade charge cam portion 14*c* presses the roller 5*e* of the trailing blade driving lever 5 to rotate the trailing blade driving lever 5 in a counterclockwise direction against the biasing force of the trailing blade driving spring 9.

Thus, the leading blade group 4*g* and the trailing blade group 5*g* are charged with a predetermined overlap amount, and the portions to be latched 4*f* and 5*f* of the leading blade driving lever 4 and the trailing blade driving lever 5 are latched on the leading blade securing lever 12 and the trailing blade securing lever 13, respectively. Subsequently, the charge lever driving member (not shown) is evacuated from the portion to be pressed 14*a*. When the charge lever driving member is evacuated, the charge lever 14 rotates in a counterclockwise direction in accordance with the biasing force by a spring (not shown) to be in the pre-movement standby state shown in FIG. 1.

Next, the configurations of the upper base plate 3, the leading blade adjusting gear 6, and the trailing blade adjusting gear 7 will be described.

The movement of the leading blade adjusting gear 6 in a thrust direction is limited by a leading blade receiving surface 3*a* (first surface) of the upper base plate 3. The leading blade receiving surface 3*a* includes the two surfaces of a leading blade inside receiving surface $3a_1$ and a leading blade outside receiving surface $3a_2$ which are arranged in concentric circles. Thus, the leading blade receiving surface 3*a* constituted by the leading blade inside receiving surface $3a_1$ and the leading blade outside receiving surface $3a_2$ is a thrust position limiter of the leading blade adjusting gear 6.

On the other hand, the movement of the trailing blade adjusting gear 7 in the thrust direction is limited only by a trailing blade receiving surface 3*b* (second surface) which has a shape equivalent to the leading blade inside receiving surface $3a_1$. In other words, the trailing blade receiving surface 3*b* is a thrust position limiter of the trailing blade adjusting gear 7.

The leading blade adjusting gear 6 and the trailing blade adjusting gear 7 are pressed on the upper base plate 3 by a biasing force in a thrust direction in addition to receiving a biasing force in a rotational direction by the leading blade driving spring 8 and the trailing blade driving spring 9. Further, a hole 6*a* of the leading blade adjusting gear 6 and a hole 7*a* of the trailing blade adjusting gear 7 engage with the leading blade shaft 1*d* and the trailing blade shaft 1*e*, respectively.

Figure 5:
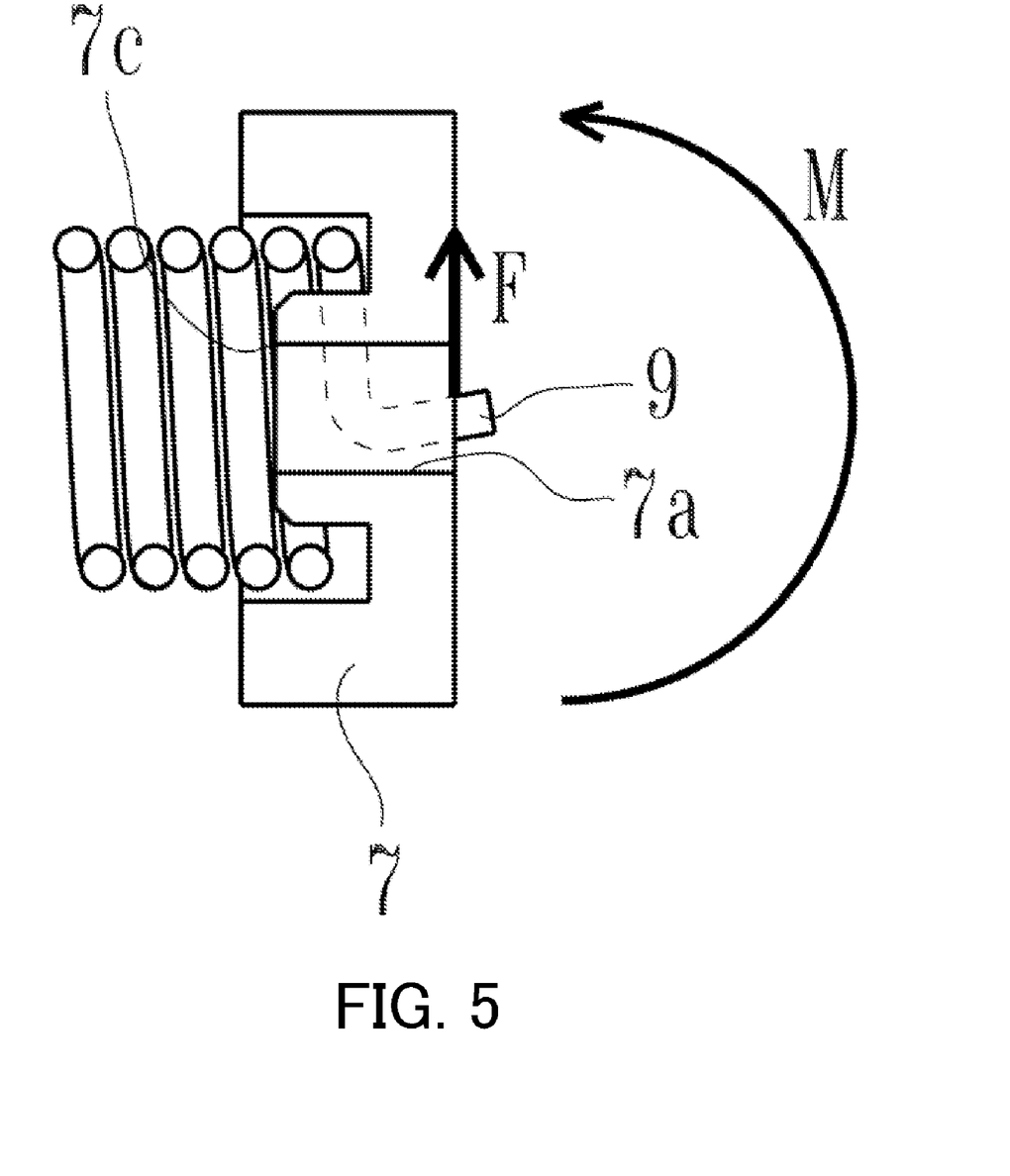
FIG. 5 is a main cross-sectional view showing a force which is applied to an adjusting gear of a focal-plane shutter in embodiment 1 of the present invention.

Next, referring to FIG. 5, the forces applied to the leading blade adjusting gear 6 and the trailing blade adjusting gear 7 will be described. FIG. 5 is a view of the trailing blade adjusting gear 7 and the trailing blade driving spring 9 extracted from FIG. 4.

The trailing blade driving spring 9 passes through the spring hook hole 7*b* shown in FIG. 3 to be hooked with the trailing blade adjusting gear 7. Therefore, a force F generated by the trailing blade driving spring 9 is applied to the trailing blade adjusting gear 7. In FIG. 5, the force F is applied to the right end of the trailing blade adjusting gear 7. The trailing blade shaft 1*e* is fitted into the hole 7*a* at a predetermined fitting backlash. Therefore, a moment M having a fulcrum point of a point 7*c* is applied to the trailing blade adjusting gear 7 by the force F.

Although the present embodiment has specifically described the trailing blade adjusting gear 7, it is the same for the leading blade adjusting gear 6.

Further, a thrust of the leading blade adjusting gear 6 is received on the leading blade receiving surface 3*a*, and a thrust of the trailing blade adjusting gear 7 is received on the trailing blade receiving surface 3*b*. Therefore, the support of the moment M is shared by a surface contacting the leading blade receiving surface 3*a* and the hole 6*a* for the leading blade adjusting gear 6, and is shared by a surface contacting the trailing blade receiving surface 3*b* and the hole 7*a* for the trailing blade adjusting gear 7.

The leading blade receiving surface 3*a* includes two receiving surfaces of a leading blade inside receiving surface $3a_1$ and a leading blade outside receiving surface $3a_2$. On the other hand, the trailing blade receiving surface 3*b* has only one receiving surface which has a shape equivalent to that of the leading blade inside receiving surface $3a_1$. Thus, an area of the leading blade receiving surface $3a$ is larger than that of the trailing blade receiving surface $3b$. Therefore, the force applied to the hole $6a$ by the moment M described above is smaller than that applied to the hole $7a$. In other words, the upper base plate 3 receives the leading blade adjusting gear 6 and the trailing blade adjusting gear 7 so that a tilt of the trailing blade adjusting gear 7 by the trailing blade driving spring 9 is larger than that of the leading blade adjusting gear 6 by the leading blade driving spring 8.

The leading blade adjusting gear 6 and the trailing blade adjusting gear 7 are molded from synthetic resin. Therefore, these adjusting gears deform a little bit due to the change with the passage of time on continuing to receive a force. When the deformation is generated, the blade velocity changes decreases because a pre-charge position of the driving spring changes.

As described above, the area of the leading blade receiving surface $3a$ is larger than that of the trailing blade receiving surface $3b$. In this case, the force received by the hole $6a$ of the leading blade adjusting gear 6 is smaller compared with that received by the hole $7a$ of the trailing blade adjusting gear 7. Therefore, the amount of deformation of the leading blade adjusting gear 6 is smaller than that of the trailing blade adjusting gear 7. As a result, a reduction of the leading blade velocity is smaller than that of the trailing blade velocity, and the generation of the blade shut caused by the change with the passage of time can be suppressed.

Embodiment 2

Figure 6:
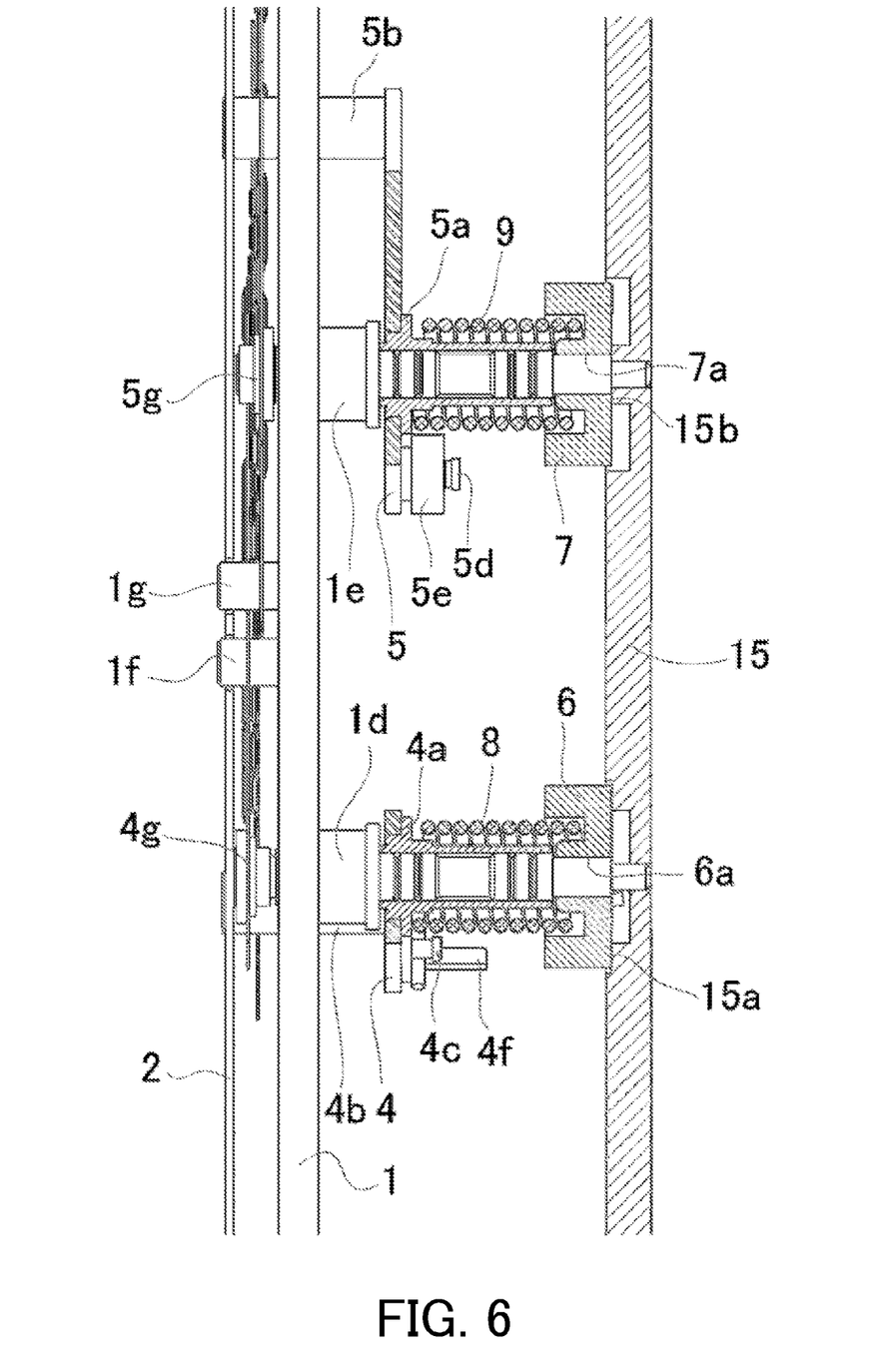
FIG. 6 is a main cross-sectional view of a focal-plane shutter in embodiment 2 of the present invention when viewed from a left side of FIG. 1.

Next, referring to FIG. 6, embodiment 2 of the present invention will be described.

The basic configuration of the present embodiment is the same as that of embodiment 1 described above. Therefore, in FIG. 6, the same elements as those shown in FIG. 4 will be denoted by the same reference numerals and the descriptions thereof will be omitted. The configurations shown in FIGS. 1 to 3 are also applicable to the present embodiment. Further, the operation of a shutter unit in the present embodiment is the same as that of embodiment 1 and the description of the operation will be omitted.

In the present embodiment, an upper base plate 15 is a member which corresponds to the upper base plate 3 of embodiment 1. Similarly to embodiment 1, moments are applied to the leading blade adjusting gear 6 and the trailing blade adjusting gear 7 for tilting them with respect to the leading blade shaft $1d$ and the trailing blade shaft $1e$ in accordance with biasing forces of the leading blade driving spring 8 and the trailing blade driving spring 9 in rotational directions, respectively.

In the present embodiment, the leading blade receiving surface $15a$ (first surface) receives only an outside of the leading blade adjusting gear 6 (corresponds to the leading blade outside receiving surface $3a_2$ of embodiment 1). In this case, the leading blade receiving surface $15a$ supports an outer edge of the leading blade adjusting gear 6.

On the other hand, the trailing blade receiving surface $15b$ (second surface) receives only an inside of the trailing blade adjusting gear 7 (corresponds to the trailing blade receiving surface $3b$ of embodiment 1). In this case, the trailing blade receiving surface $15b$ supports an inner edge of the trailing blade adjusting gear 7.

Similarly to embodiment 1, the support of this moment is shared by a surface contacting the leading blade receiving surface $15a$ and the hole $6a$ for the leading blade adjusting gear 6, and is shared by a surface contacting the trailing blade receiving surface $15b$ and the hole $7a$ for the trailing blade adjusting gear 7.

The leading blade receiving surface $15a$ supports the outer edge of the leading blade adjusting gear 6, and the trailing blade receiving surface $15b$ supports the inner edge of the trailing blade adjusting gear 7. Therefore, a distance between the leading blade receiving surface $15a$ and the leading blade shaft $1d$ is longer than that between the trailing blade receiving surface $15b$ and the trailing blade shaft $1e$, and the force applied to the hole $6a$ by the moment described above is smaller than that applied to the hole $7a$. In other words, the upper base plate 15 receives the leading blade adjusting gear 6 and the trailing blade adjusting gear 7 so that the tilt of the trailing blade adjusting gear 7 caused by the trailing blade driving spring 9 is larger than that of the leading blade adjusting gear 6 caused by the leading blade driving spring 8.

Accordingly, similarly to embodiment 1, the force received by the hole $6a$ of the leading blade adjusting gear 6 is smaller compared with that received by the hole $7a$ of the trailing blade adjusting gear 7. Therefore, an amount of deformation of the leading blade adjusting gear 6 is smaller than that of the trailing blade adjusting gear 7. As a result, the generation of the blade shut due to the change with the passage of time can be suppressed because a reduction of the leading blade velocity is smaller than that of the trailing blade velocity.

Embodiment 3

Figure 7:
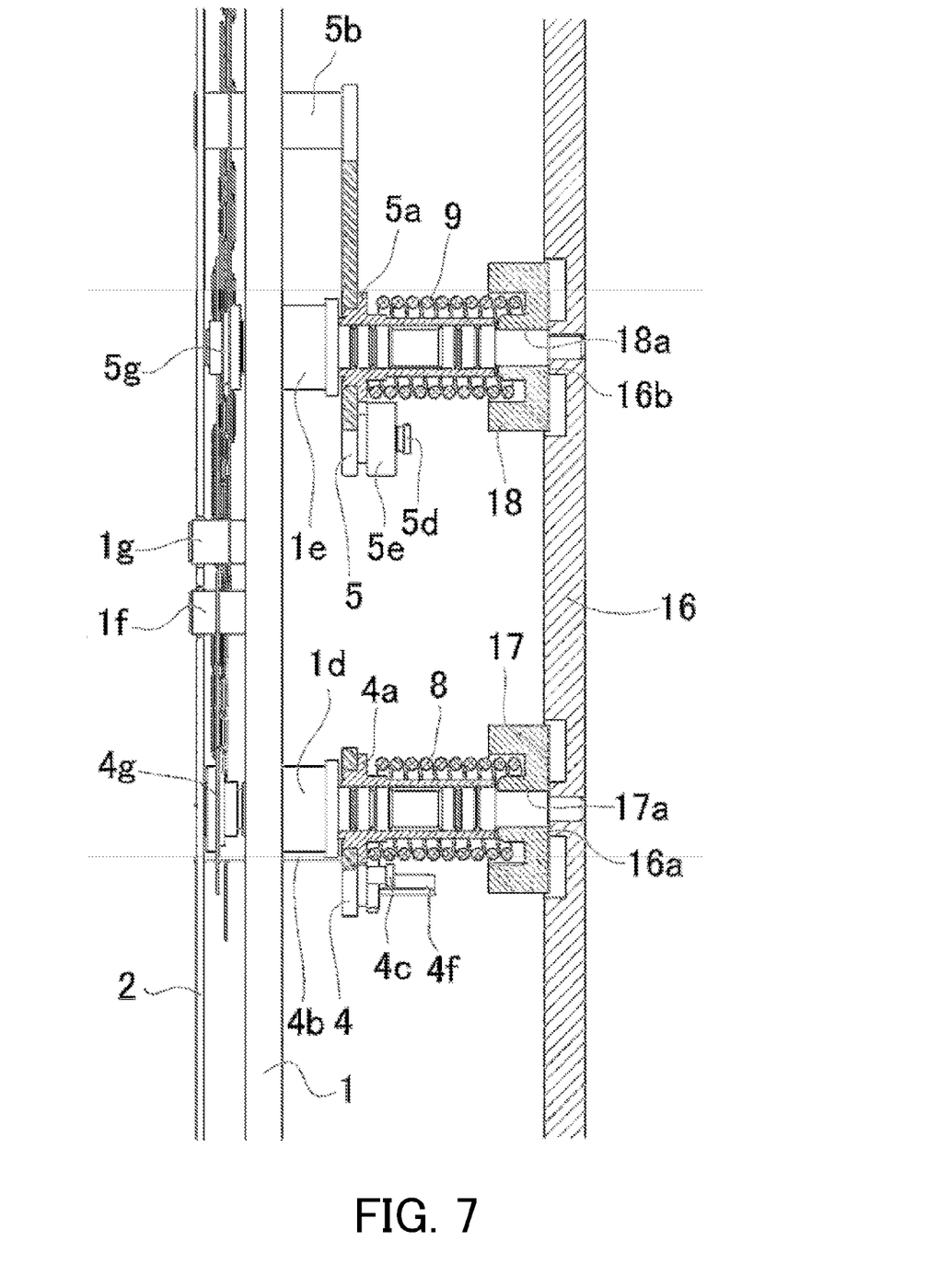
FIG. 7 is a main cross-sectional view of a focal-plane shutter in embodiment 3 of the present invention when viewed from a left side of FIG. 1.

Next, referring to FIG. 7, embodiment 3 of the present invention will be described.

The basic configuration of the present embodiment is the same as that of embodiment 1 or 2 described above. Therefore, in FIG. 7, the same elements as those shown in FIG. 4 or 6 will be denoted by the same reference numerals and the descriptions thereof will be omitted. The configurations shown in FIGS. 1 to 3 are also applicable to the present embodiment. Further, the operation of a shutter unit in the present embodiment is the same as that of embodiment 1 and the description of the operation will be omitted.

In the present embodiment, an upper base plate 16 is a member which corresponds to the upper base plate 3 of embodiment 1 or the upper base plate 15 of embodiment 2. Similarly to embodiment 1 or 2, moments are applied to a leading blade adjusting gear 17 and a trailing blade adjusting gear 18 for tilting them with respect to the leading blade shaft $1d$ and the trailing blade shaft $1e$ in accordance with biasing forces of the leading blade driving spring 8 and the trailing blade driving spring 9 in rotational directions, respectively. In the present embodiment, a leading blade receiving surface $16a$ (first surface) and a trailing blade receiving surface $16b$ (second surface) have the same shape each other.

In the present embodiment, the materials of the leading blade adjusting gear 17 and the trailing blade adjusting gear 18 are different from those in embodiment 1 or 2. While all of the adjusting gears of embodiment 1 or 2 are made of synthetic resin, the trailing blade adjusting gear 18 of the present embodiment is made of synthetic resin and the leading blade adjusting gear 17 is made of metal.

Further, in the present embodiment, similarly to embodiment 1 or 2, forces by the moments described above are applied to holes $17a$ and $18a$.

Because the trailing blade adjusting gear 18 is molded by synthetic resin, it is deformed a little bit in accordance with the change with the passage of time when continuing to receive a force. On the other hand, because the leading blade adjusting gear 17 is made of metal, it hardly deforms even if it receives a force. Therefore, a reduction of the leading blade velocity is smaller than that of the trailing blade velocity and the generation of the blade shut caused by the change with the passage of time can be suppressed.

The present embodiment has described the case where the leading blade adjusting gear 17 is made of metal and the trailing blade adjusting gear 18 is made of synthetic resin, but is not limited to this. For example, even if both the leading blade adjusting gear 17 and the trailing blade adjusting gear 18 are made of synthetic resin, the same effect as that described above can be obtained by making the leading blade adjusting gear 17 using a material which is harder to deform than the trailing blade adjusting gear 18.

According to the focal-plane shutter and the image pickup apparatus in each of the above embodiments, even if the change of the blade velocity is generated due to the change with the passage of time, a reduction of the leading blade velocity can be smaller than that of the trailing blade velocity. Therefore, the generation of the blade shut due to the change with the passage of time can be suppressed.

A further embodiment of the present invention provides a focal-plane shutter 105 comprising a leading blade driving member 4 configured to be rotatably fitted onto a first shaft 1d provided on a shutter base plate 1 and to be driven by a biasing force of a leading blade driving spring 8; a trailing blade driving member 5 configured to be rotatably fitted onto a second shaft 1e provided on the shutter base plate 1 and to be driven by a biasing force of a trailing blade driving spring 9; a leading blade adjusting member 6 configured to be rotatably fitted onto the first shaft 1d and to adjust the biasing force of the leading blade driving spring 8; a trailing blade adjusting member 7 configured to be rotatably fitted onto the second shaft 1e and to adjust the biasing force of the trailing blade driving spring 9; and an upper base plate 3 comprising a first surface 3a which is a thrust position limiter of the leading blade adjusting member 6 and a second surface 3b which is a thrust position limiter of the trailing blade adjusting member 7, wherein an area of the first surface 3a is larger than that of the second surface 3b.

A further embodiment of the present invention provides a focal-plane shutter 105 comprising a leading blade driving member 4 configured to be rotatably fitted onto a first shaft 1d provided on a shutter base plate 1 and to be driven by a biasing force of a leading blade driving spring 8; a trailing blade driving member 5 configured to be rotatably fitted onto a second shaft 1e provided on the shutter base plate 1 and to be driven by a biasing force of a trailing blade driving spring 9; a leading blade adjusting member 6 configured to be rotatably fitted onto the first shaft 1d and to adjust the biasing force of the leading blade driving spring 8; a trailing blade adjusting member 7 configured to be rotatably fitted onto the second shaft 1e and to adjust the biasing force of the trailing blade driving spring 9; and an upper base plate 15 comprising a first surface 15a which is a thrust position limiter of the leading blade adjusting member 6 and a second surface 15b which is a thrust position limiter of the trailing blade adjusting member 7, wherein the first surface 15a is configured to support an outer edge of the leading blade adjusting member 6 and the second surface 15b is configured to support an inner edge of the trailing blade adjusting member 7.

A further embodiment of the present invention provides a focal-plane shutter 105 comprising a leading blade driving member 4 configured to be rotatably fitted onto a first shaft 1d provided on a shutter base plate 1 and to be driven by a biasing force of a leading blade driving spring 8; a trailing blade driving member 5 configured to be rotatably fitted onto a second shaft 1e provided on the shutter base plate 1 and to be driven by a biasing force of a trailing blade driving spring 9; a leading blade adjusting member 6 configured to be rotatably fitted onto the first shaft 1d and to adjust the biasing force of the leading blade driving spring 8; a trailing blade adjusting member 7 configured to be rotatably fitted onto the second shaft 1e and to adjust the biasing force of the trailing blade driving spring 9; and an upper base plate 16 comprising a first surface 16a which is a thrust position limiter of the leading blade adjusting member 6 and a second surface 16b which is a thrust position limiter of the trailing blade adjusting member 7, wherein the leading blade adjusting member 6 is made of metal and the trailing blade adjusting member 7 is made of synthetic resin.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-236625, filed on Sep. 16, 2008, which is hereby incorporated by reference herein in its entirety.

What is claimed is:

1. A focal-plane shutter comprising:
   a leading blade driving member configured to be rotatably fitted onto a first shaft provided on a shutter base plate and to be driven by a biasing force of a leading blade driving spring;
   a trailing blade driving member configured to be rotatably fitted onto a second shaft provided on the shutter base plate and to be driven by a biasing force of a trailing blade driving spring;
   a leading blade adjusting member configured to be rotatably fitted onto the first shaft and to adjust the biasing force of the leading blade driving spring;
   a trailing blade adjusting member configured to be rotatably fitted onto the second shaft and to adjust the biasing force of the trailing blade driving spring; and
   a tilt adjusting member for adjusting a tilt of the trailing blade adjusting member caused by the trailing blade driving spring to be greater than that of the leading blade adjusting member caused by the leading blade driving spring.

2. A focal-plane shutter comprising:
   a leading blade driving member configured to be rotatably fitted onto a first shaft provided on a shutter base plate and to be driven b a biasing force of a leading blade driving spring;
   a trailing blade driving member configured to be rotatably fitted onto a second shaft provided on the shutter base plate and to be driven by a biasing force of a trailing blade driving spring;
   a leading blade adjusting member configured to be rotatably fitted onto the first shaft and to adjust the biasing force of the leading blade driving spring;
   a trailing blade adjusting member configured to be rotatably fitted onto the second shaft and to adjust the biasing force of the trailing blade driving spring; and
   an upper base plate configured to receive the leading blade adjusting member and the trailing blade adjusting member so that a tilt of the trailing blade adjusting member caused by the trailing blade driving spring is greater than that of the leading blade adjusting member caused by the leading blade driving spring.

3. A focal-plane shutter according to claim 2, wherein the upper base plate comprises a first surface which is a thrust position limiter of the leading blade adjusting member and a second surface which is a thrust position limiter of the trailing blade adjusting member.

4. A focal-plane shutter according to claim 3, wherein an area of the first surface is larger than that of the second surface.

5. A focal-plane shutter according to claim 3, wherein the first surface is configured to support an outer edge of the leading blade adjusting member and the second surface is configured to support an inner edge of the trailing blade adjusting member.

6. A focal-plane shutter according to claim 1, wherein the leading blade adjusting member and the trailing blade adjusting member are made of synthetic resin.

7. A focal-plane shutter according to claim 1, wherein the leading blade adjusting member is made of metal and the trailing blade adjusting member is made of synthetic resin.

8. A focal-plane shutter according to claim 2, wherein the upper base plate is made of synthetic resin.

9. An image pickup apparatus comprising:
an image pickup element configured to perform photoelectric conversion; and
a focal-plane shutter comprising:
a leading blade driving member configured to be rotatably fitted onto a first shaft provided on a shutter base plate and to be driven by a biasing force of a leading blade driving spring;
a trailing blade driving member configured to be rotatably fitted onto a second shaft provided on the shutter base plate and to be driven by a biasing force of a trailing blade driving spring;
a leading blade adjusting member configured to be rotatably fitted onto the first shaft and to adjust the biasing force of the leading blade driving spring;
a trailing blade adjusting member configured to be rotatably fitted onto the second shaft and to adjust the biasing force of the trailing blade driving spring; and
a member for causing a tilt of the trailing blade adjusting member caused by the trailing blade driving spring to be greater than that of the leading blade adjusting member caused by the leading blade driving spring.

10. An image pickup apparatus comprising:
a leading blade driving member configured to be rotatably fitted onto a first shaft provided on a shutter base plate and to be driven by a biasing force of a leading blade driving spring;
a trailing blade driving member configured to be rotatably fitted onto a second shaft provided on the shutter base plate and to be driven by a biasing force of a trailing blade driving spring;
a leading blade adjusting member configured to be rotatably fitted onto the first shaft and to adjust the biasing force of the leading blade driving spring;
a trailing blade adjusting member configured to be rotatably fitted onto the second shaft and to adjust the biasing force of the trailing blade driving spring; and
an upper base plate configured to receive the leading blade adjusting member and the trailing blade adjusting member so that a tilt of the trailing blade adjusting member caused by the trailing blade driving spring is greater than that of the leading blade adjusting member caused by the leading blade driving spring.

* * * * *